US007949051B2

(12) United States Patent
Yankilevich

(10) Patent No.: US 7,949,051 B2
(45) Date of Patent: May 24, 2011

(54) MOSQUITO NOISE DETECTION AND REDUCTION

(75) Inventor: Itzik Yankilevich, Tel-Aviv (IL)

(73) Assignee: Broadcom Corporation, Irvine, CA (US)

( * ) Notice: Subject to any disclaimer, the term of this patent is extended or adjusted under 35 U.S.C. 154(b) by 1053 days.

(21) Appl. No.: 10/922,084

(22) Filed: Aug. 20, 2004

(65) Prior Publication Data

US 2005/0265446 A1 Dec. 1, 2005

Related U.S. Application Data

(60) Provisional application No. 60/574,382, filed on May 26, 2004.

(51) Int. Cl.
*H04N 11/04* (2006.01)
(52) U.S. Cl. .................................. 375/240.24
(58) Field of Classification Search .................. None
See application file for complete search history.

(56) References Cited

U.S. PATENT DOCUMENTS

| | | | |
|---|---|---|---|
| 4,963,030 A | 10/1990 | Makur | |
| 5,214,507 A * | 5/1993 | Aravind et al. | 348/390.1 |
| 5,353,061 A | 10/1994 | Rodriguez et al. | |
| 5,359,676 A * | 10/1994 | Fan | 382/246 |
| 5,377,018 A * | 12/1994 | Rafferty | 358/426.02 |
| 5,684,714 A | 11/1997 | Yogeshwar et al. | |
| 5,844,627 A | 12/1998 | May et al. | |
| 6,005,626 A | 12/1999 | Ding | |
| 6,224,640 B1 | 5/2001 | Tucholski | |
| 6,259,819 B1 * | 7/2001 | Andrew et al. | 382/248 |
| 6,285,710 B1 | 9/2001 | Hurst, Jr. et al. | |

(Continued)

FOREIGN PATENT DOCUMENTS

CN 1268842 10/2000

(Continued)

OTHER PUBLICATIONS

Song, B.C. and Chun, K.W., "Motion-Compensated Noise Estimation for Efficient Pre-Filtering in a Video Encoder," Proceedings 2003 International Conference on Image Processing, ICIP-2003, Barcelona, Spain, Sep. 14-17, 2003, vol. 2 of 3, pp. 211-214.

(Continued)

*Primary Examiner* — Marsha D Banks Harold
*Assistant Examiner* — Christopher Findley
(74) *Attorney, Agent, or Firm* — Sterne, Kessler, Goldstein & Fox P.L.L.C.

(57) ABSTRACT

A system and method for detecting and reducing mosquito noise are disclosed. Areas within a frame with mosquito noise are detected by calculating the variance of the luminance blocks in a macroblock, determining the minimum variance of the macroblock luminance blocks, and comparing the minimum variance to a mosquito noise threshold. If the minimum variance is greater than the mosquito noise threshold, then the macroblock is considered a high activity macroblock and the corresponding macroblock bit in the frame bitmap is set. If the minimum variance is less than or equal to the mosquito noise threshold, then the macroblock is considered a low activity macroblock, and the corresponding macroblock bit in the frame bit map is cleared. If the current macroblock bit is set in the corresponding frame bitmap or if at least one of its adjacent eight macroblock bits is set in the corresponding frame bitmap, then the current macroblock requires mosquito noise reduction. Mosquito noise in the current macroblock is reduced by reducing the original bit rate quantizer scale to achieve the target of reducing the mosquito noise.

33 Claims, 6 Drawing Sheets

U.S. PATENT DOCUMENTS

| | | | |
|---|---|---|---|
| 6,459,735 B1 | 10/2002 | Suito et al. | |
| 6,634,649 B1 | 10/2003 | Yamaguchi et al. | |
| 6,748,113 B1 * | 6/2004 | Kondo et al. | 382/232 |
| 6,834,080 B1 | 12/2004 | Furukawa et al. | |
| 7,023,914 B2 | 4/2006 | Furukawa et al. | |
| 7,072,396 B2 | 7/2006 | Wang | |
| 7,194,030 B2 | 3/2007 | Xiong et al. | |
| 7,453,938 B2 | 11/2008 | Haskell et al. | |
| 2002/0024999 A1* | 2/2002 | Yamaguchi et al. | 375/240.03 |
| 2004/0029002 A1 | 2/2004 | Sargeant et al. | |
| 2004/0151243 A1* | 8/2004 | Bhaskaran et al. | 375/240.03 |
| 2005/0129330 A1* | 6/2005 | Shyshkin | 382/275 |
| 2005/0238239 A1 | 10/2005 | Yankilevich | |
| 2007/0286501 A1 | 12/2007 | Sato et al. | |

FOREIGN PATENT DOCUMENTS

| | | |
|---|---|---|
| CN | 1286575 A | 3/2001 |
| EP | 1039760 | 9/2000 |
| EP | 1 250 012 | 10/2002 |
| EP | 1 377 071 A1 | 1/2004 |
| EP | 1377071 A1 * | 1/2004 |
| WO | WO 02/33650 A1 * | 4/2002 |

OTHER PUBLICATIONS

Song, B.C. and Chun, K.W., "Motion-Compensated Temporal Filtering for Denoising in Video Encoder," Electronics Letters, Jun. 24, 2004, vol. 40, No. 13, pp. 802-804.

Yuen, M., et al., "A survey of hybrid MC/DPCM/DCT video coding distortions," *Signal Processing* 70(3): 247-278, Elsevier Science B.V., Amsterdam, Netherlands (Nov. 1998).

Zhike, J., et al., "Adaptive Quantization Scheme for Very Low Bit Rate Video Coding," Proceedings of the Asia-Pacific Conference on Communications and Optoelectronics and Communications Conference, vol. 2, pp. 940-943, APCC/OECC, (Oct. 1999).

European Search Report issued in European Patent Application No. 05010165.8, European Patent Office, Berlin, Germany, mailed on Sep. 6, 2010.

* cited by examiner

MOSQUITO NOISE DETECTION AND REDUCTION

CROSS REFERENCE TO RELATED APPLICATIONS

This application claims priority from U.S. provisional application No. 60/574,382 entitled "Mosquito Noise Detection and Reduction" by Itzik Yankilevich and filed on May 26, 2004 which is incorporated by reference herein in its entirety.

FIELD OF THE INVENTION

The present invention relates generally to video compression, and more specifically to a digital video encoder system and method for detecting and reducing mosquito noise.

BACKGROUND OF THE INVENTION

Digital video products and services and devices for storage and retrieval of video streams on the Internet are ubiquitous in the marketplace. Due to limitations in digital signal storage capacity and limitations in network and broadcast bandwidth, compression of digital video signals is essential to digital video storage and transmission. As a result, many standards for compression and encoding of digital video signals have been promulgated. These standards specify with particularity the form of encoded digital video signals and how such signals are to be decoded for presentation to a viewer.

One example of such a standard is the ISO/IEC international Standard 13818 (generally referred to as MPEG-2 format) created by the Moving Picture Experts Group (MPEG) and is described in ITU-T Recommendation H.262, ISO/IEC 13818-2: 1996 Information technology—Generic coding of moving pictures and associated audio—Part 2: Video, which document is incorporated herein by reference in its entirety. Although the MPEG-2 standard specifies a general coding methodology and syntax for generating an MPEG-2 compliant bitstream, many variations are permitted to accommodate a plurality of different applications and services such as desktop video publishing, video conferencing, digital storage media, and television broadcast. Thus, MPEG-2 allows significant discretion as to how the digital video signals are to be transformed from a native, uncompressed format to the specified encoded format. In other words, encoding steps are not rigidly defined allowing tradeoffs between video quality, compression ratio, and compute power of the encoder. As a result, many different digital video signal encoders currently exist and many approaches are used to encode digital video signals.

Various noise artifacts associated with MPEG video signals are known in the art. One example of such a noise artifact is referred to as "mosquito" noise. Mosquito noise results around the sharp edges of images that results from attenuation of high frequency transform coefficients. The mosquito noise artifact is an effect in which it seems that a cloud of mosquitos appear around an object. Therefore, what is needed is a system and method for detecting and reducing mosquito noise in MPEG video systems.

Further limitations and disadvantages of conventional and traditional approaches will become apparent to one of skill in the art through comparison of such systems with the present invention as set forth in the remainder of the present application and with reference to the drawings.

SUMMARY OF THE INVENTION

According to the present invention, these objects are achieved by a system and method as defined in the claims. The dependent claims define advantageous and preferred embodiments of the present invention.

The present invention generally pertains to a system and method for detecting and reducing mosquito noise. Areas within a frame with mosquito noise are detected by calculating the variance of the luminance blocks in a macroblock, determining the minimum variance of the macroblock luminance blocks, and comparing the minimum variance to a mosquito noise threshold. If the minimum variance is greater than the mosquito noise threshold, then the macroblock is considered a high activity macroblock and the corresponding macroblock bit in the frame bitmap is set. If the minimum variance is less than or equal to the mosquito noise threshold, then the macroblock is considered a low activity macroblock, and the corresponding macroblock bit in the frame bit map is cleared. If the current macroblock bit is set in the corresponding frame bitmap or if at least one of its adjacent eight macroblock bits is set in the corresponding frame bitmap, then the current macroblock requires mosquito noise reduction. The macroblocks to the right of and below the current macroblock belong to the bit setting/clearing of the previous frame. Mosquito noise reduction is performed by reducing the original bit rate quantizer scale code. The mosquito noise detection and reduction of the present invention is used in a single pass encoding and performed in raster scan. In other words, the mosquito noise reduction and detection system of the present invention is performed macroblock by macroblock from left to right, row by row, from top to bottom.

In one aspect, a system for detecting mosquito noise in a video system comprises a macroblock analyzer for determining whether a current macroblock within a frame is a high activity macroblock, a bit setter/clearer for indicating on a frame bitmap whether the current macroblock is a high activity macroblock, and a frame bitmap analyzer for determining whether the current macroblock requires mosquito noise reduction by evaluating the frame bitmap. If the current macroblock bit is set in the corresponding frame bitmap or if at least one of its adjacent eight macroblock bits is set in the corresponding frame bitmap, then the current macroblock requires mosquito noise reduction. A mosquito noise reducer reduces the original bit rate quantizer scale of the macroblock to achieve the target of reducing the mosquito noise.

In another aspect, a method for detecting and reducing mosquito noise in a video frame comprises the steps of determining whether a current macroblock in the current frame is a high activity macroblock; indicating on a frame bitmap whether the current macroblock is a high activity macroblock; evaluating the frame bitmap to determine whether the current macroblock requires mosquito noise reduction; and reducing mosquito noise in the current frame by reducing the original bit rate quantizer scale to achieve the target of reducing the mosquito noise.

Thus, the system and method of the present invention advantageously detect potential mosquito noise areas in a frame and allocates those areas more bits than usual thereby reducing the mosquito noise. These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

DETAILED DESCRIPTION OF THE INVENTION

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known processes and steps have not been described in detail in order not to unnecessarily obscure the present invention.

The invention generally pertains to a system and method for detecting and reducing mosquito noise. Areas within a frame with mosquito noise are detected by calculating the variance of the luminance blocks in a current macroblock, determining the minimum variance of the current macroblock luminance blocks, and comparing the minimum variance to a mosquito noise threshold. If the minimum variance is greater than the mosquito noise threshold, then the current macroblock is considered a high activity macroblock and the corresponding macroblock bit in the frame bitmap is set. If the minimum variance is less than or equal to the mosquito noise threshold, then the current macroblock is considered a low activity macroblock, and the corresponding macroblock bit in the frame bit map is cleared. The frame bitmap is then evaluated to determine if mosquito noise reduction for a current macroblock is required. If the current macroblock bit is set in the corresponding frame bitmap or if at least one of its adjacent eight macroblock bits is set in the corresponding frame bitmap, then the current macroblock requires mosquito noise reduction. Mosquito noise reduction is performed by reducing the original bit rate quantiser scale code.

Embodiments of the invention are discussed below with references to FIGS. 1 to 6. However, those skilled in the art will readily appreciate that the detailed description given herein with respect to these figures is for explanatory purposes as the invention extends beyond these limited embodiments.

Figure 1:
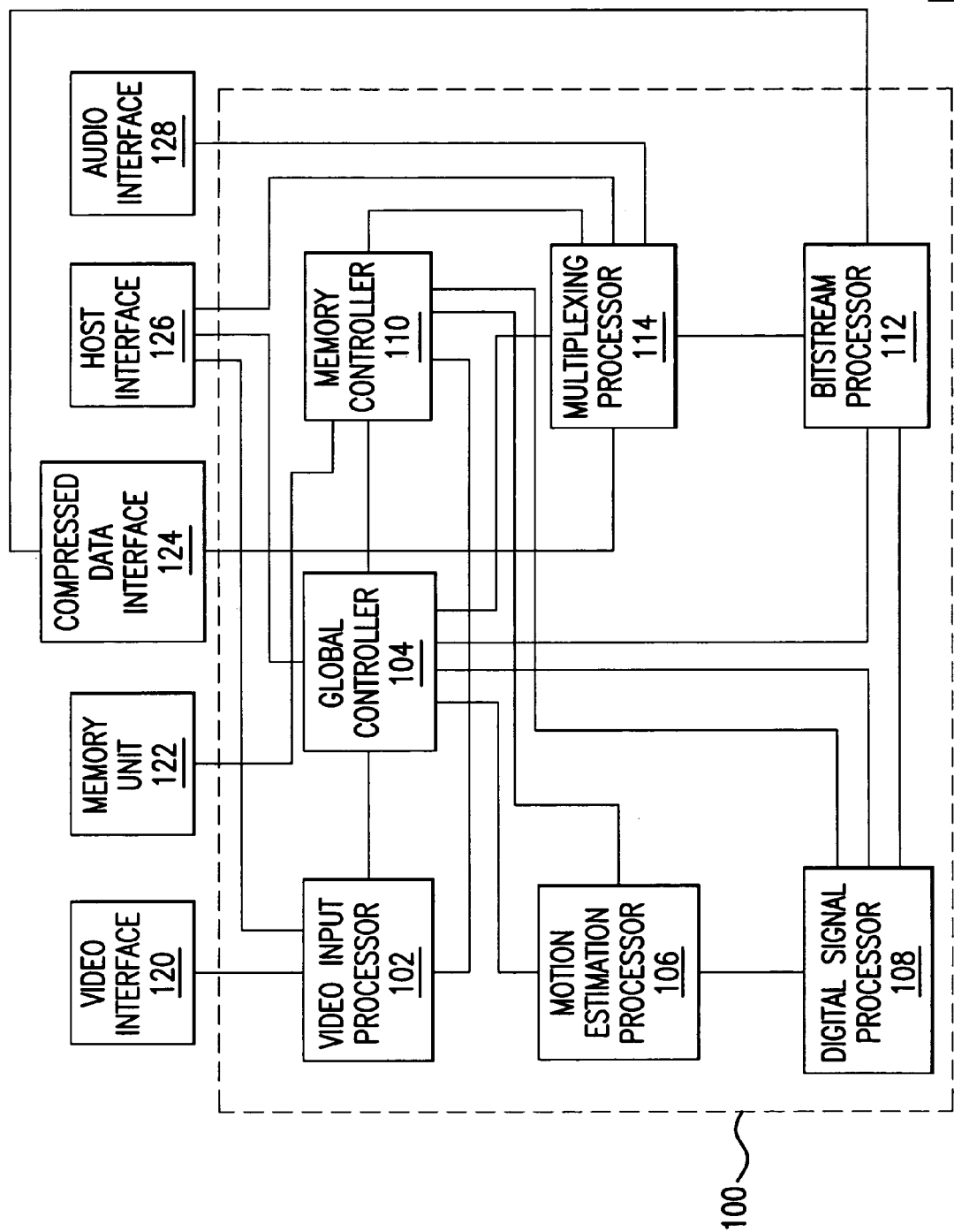
FIG. 1 is a high level block diagram of a video encoder constructed and operative in accordance with a preferred embodiment of the invention.

Referring now to FIG. 1, there is shown a block diagram of one embodiment of a video encoding system 100 constructed and operative in accordance with a preferred embodiment of the invention. Video encoder 100 is preferably a parallel digital processor, such as the BCM7040 Single Channel MPEG encoder or the BCM7041 Dual Channel MPEG encoder produced by Broadcom Corporation of Irvine, Calif., designed for the purposes of real-time video compression and multiplexing, such as for MPEG encoding and the like. Encoder 100 can be incorporated in a single chip and installed in digital camcorders, recordable digital video disk (DVD), game machines, desktop multimedia, video broadcast equipment, video authoring systems, video streaming and video conferencing equipment, security and surveillance systems, and the like. The present invention overcomes the disadvantage of the prior art by providing a novel approach to video compression and encoding, and, as per this approach, a novel method for detecting and encoding mosquito noise.

Encoder 100 includes a video input processor 102, a global controller 104, a motion estimation processor 106, a digital signal processor 108, a memory controller 110, a bitstream processor 112 and a multiplexing processor 114. Encoder 100 is preferably connectable to a video interface 120, an external memory unit 122, a compressed data interface 124, a host interface 126, and an audio interface 128. Typically video interface 120 supplies a digital video signal and audio interface 128 supplies a digital audio signal.

Host interface 126 is typically connected to an external host (not shown) and acts as a user interface between encoder 100 and the user. Host interface 126 provides to encoder 100 microcodes, commands, data parameters and the like received from a user or a supervising system. Host interface 126 also provides information received from encoder 100 to the user. Host interface 126 provides access to the compressed data and is used to provide encoder 100 with uncompressed digitized video and/or audio and/or user data.

In a preferred embodiment of the present invention, encoder 100 is operable either in a programming mode or an operational mode, and is capable of operating in both modes simultaneously. In the programming mode, an external host transfers, via host interface 126, microcodes, commands and data parameters to global controller 104. Global controller 104 transfers the microcodes, commands and data parameters to video input processor 102, motion estimation processor 106, digital signal processor 108, memory controller 110, bitstream processor 112 and multiplexing processor 114. In the operational mode, video input processor 102 captures a motion video signal, via video interface 120, from an external video source (not shown). In an alternative embodiment processor 102 captures a motion video signal, via host interface 126.

Video input processor 102 then performs statistical analysis of the video signal, thereby detecting 3-2 pulled up sequences and developments in the video contents, such as scene change, sudden motion, fade in/fade out and the like. Video input processor 102 also performs resolution downscaling thereby allowing, or enabling compression not only of the original resolution frames, but also reduced resolution frames (such as SIF, half D1 etc.). Additionally, video input processor 102 also pre-processes the video signal, such as spatial filtering, noise reduction, image enhancement and the like. Furthermore, video input processor 102 decreases the frame rate by decimating (dropping) frames thus allowing flexible rate control. Since device 100 is operable in "feed forward" manner, in order to perform the statistical analysis, a video feedback from the memory unit 122 is implementable. Such feedback allows interframe (picture to picture) analysis.

Video input processor 102 accumulates the scaled and processed video data and transfers the data in bursts to memory unit 122, via memory controller 110. Memory controller 110 stores them in memory unit 122.

In a preferred embodiment, encoder 100 operates under MPEG video/audio compression standards. Hence, a data block represents a macroblock, which is a sixteen by sixteen matrix of luminance pixels and two, four or eight, eight by eight matrices of chrominance pixels as defined by MPEG standards. For purposes of clarity herein, reference to a reference or previous frame refers to a frame that has already been encoded, reconstructed and stored in memory unit 112, and which is compared to the current frame.

The memory controller 110 retrieves a current frame macroblock, and certain parts of the reference frames (referred hereto as search area) from memory unit 122 and loads them into motion estimation processor 106. Motion estimation processor 106 compares the current frame macroblock with the respective reference search area in accordance with a sequence of compression commands, thereby producing an estimation of the motion of the current frame macroblock. This estimation is used to remove temporal redundancy from the video signal.

Motion estimation processor 106 transfers the resulting motion estimation to global controller 104. Motion estimation processor 106 also transfers the current frame macroblock and the corresponding reference frames macroblocks to digital signal processor 108.

Digital signal processor 108 determines whether a macroblock contains mosquito noise and encodes it accordingly. Details regarding detecting and encoding mosquito noise are described more fully with reference to FIGS. 2 to 6. Additionally, digital signal processor 108 also performs other series of macroblock processing operations intended to remove the spatial redundancy of the video signal, such as discrete cosine transform, macroblock type selection, quantization, rate control and the like. Digital signal processor 108 transfers the compressed data to the bitstream processor 112. Digital signal processor 108 further processes the compressed frame, thus reconstructing the reference frames, and transfers the reconstructed reference frames to memory unit 122 via memory controller 110, thereby overwriting some of the existing reference frames.

Bitstream processor 112 encodes the compressed video data into a standard MPEG format, in accordance with a sequence of known in the art encoding commands. The encoded video data stream is then transfered to compressed data interface 124 via multiplexing processor 114. It will be noted that the compression data interface 124 is connectable to any data receptacle element, such as a storage unit, a transmission line, a computer bus or the like.

According to one embodiment of the present invention, multiplexing processor 114 captures, via host interface 126, digitized audio and/or user data from an external audio/data source (not shown). According to an alternative embodiment of the present invention, multiplexing processor 114 captures the digitized audio via audio interface 128.

Multiplexing processor 114 multiplexes the encoded video and the digitized audio and/or user data streams (as received from bitstream processor 112) and generates, according to a sequence of optimized multiplexing commands, MPEG standard format streams such as packetized elementary stream, program stream, transport stream and the like. Multiplexing processor 114 transfers the multiplexed video/audio/data streams to compressed data interface 124. Multiplexing processor 114 also transfers the multiplexed video/audio/data streams to host interface 126.

Global controller 104 controls and schedules the video input processor 102, the motion estimation processor 106, the digital signal processor 108, the memory controller 110, the bitstream processor 112 and the multiplexing processor 114.

Figure 2:
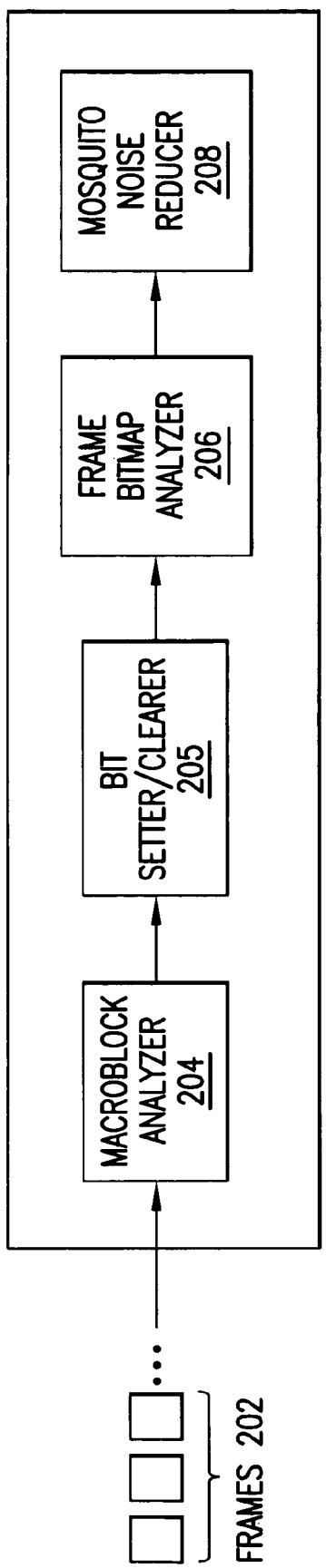
FIG. 2 is a block diagram of a mosquito noise detector and reducer in accordance with one embodiment of the present invention.

Referring now to FIG. 2, there is shown a block diagram of the mosquito noise detector and reducer portion of an encoder system 200 operative in accordance with one embodiment of the present invention. The present invention overcomes the disadvantages of the prior art by providing a novel approach to video compression and encoding, and, as per this approach, a novel method for detecting and reducing mosquito noise. Thus, the present invention improves the overall quality of the video image.

Mosquito noise detector and reducer 200 comprises a macroblock analyzer 204, a bit setter/clearer 205, a frame bitmap analyzer 206, and a mosquito noise reducer 208. In one embodiment, the components of mosquito noise detector and reducer 200 are performed within the digital signal processor 108 of encoder 100 from FIG. 1. However, one skilled in the art will realize that the present invention is not limited to this configuration but that the components illustrated in system 200 may be designed in a different arrangement while still adhering to the principles of the present invention.

Mosquito noise detector and reducer 200 receives as input a plurality of video frames 202 and determines whether a macroblock within the frame is a high activity macroblock. The present invention assumes temporal correlation and evaluates and encodes macroblocks for mosquito noise in a single pass encoding in raster scan order. In other words, the macroblocks are evaluated from left to right, row by row, from top to bottom. Mosquito noise tends to appear primarily inside and around areas with high activity in a frame. An area of high activity is a group of adjacent macroblocks, each with a variance above a specific empirically determined threshold.

After the macroblock has been evaluated by the macroblock analyzer 204 for high activity, the bit setter/clearer 205 then indicates whether the macroblock is a high activity block. In one embodiment, if the current macroblock is a high activity block, then the bit setter/clearer 205 sets the corresponding macroblock bit in the frame bitmap. If the current macroblock is not a high activity block (e.g. a low activity block), then the bit setter/clearer 205 clears the corresponding bit in the frame bitmap. The frame bitmap analyzer 206 then analyzes the frame bitmap to determine whether the frame contains mosquito noise. If at least one of the nine macroblock bits (i.e. either the current macroblock bit or at least one of the eight macroblock bits adjacent to the current macroblock bit in the frame bitmap) is set in the frame bitmap, then the current macroblock requires mosquito noise reduction. Mosquito noise reduction is performed by reducing the original bit rate quantiser scale code to achieve the target of reducing the mosquito noise.

Figure 3:
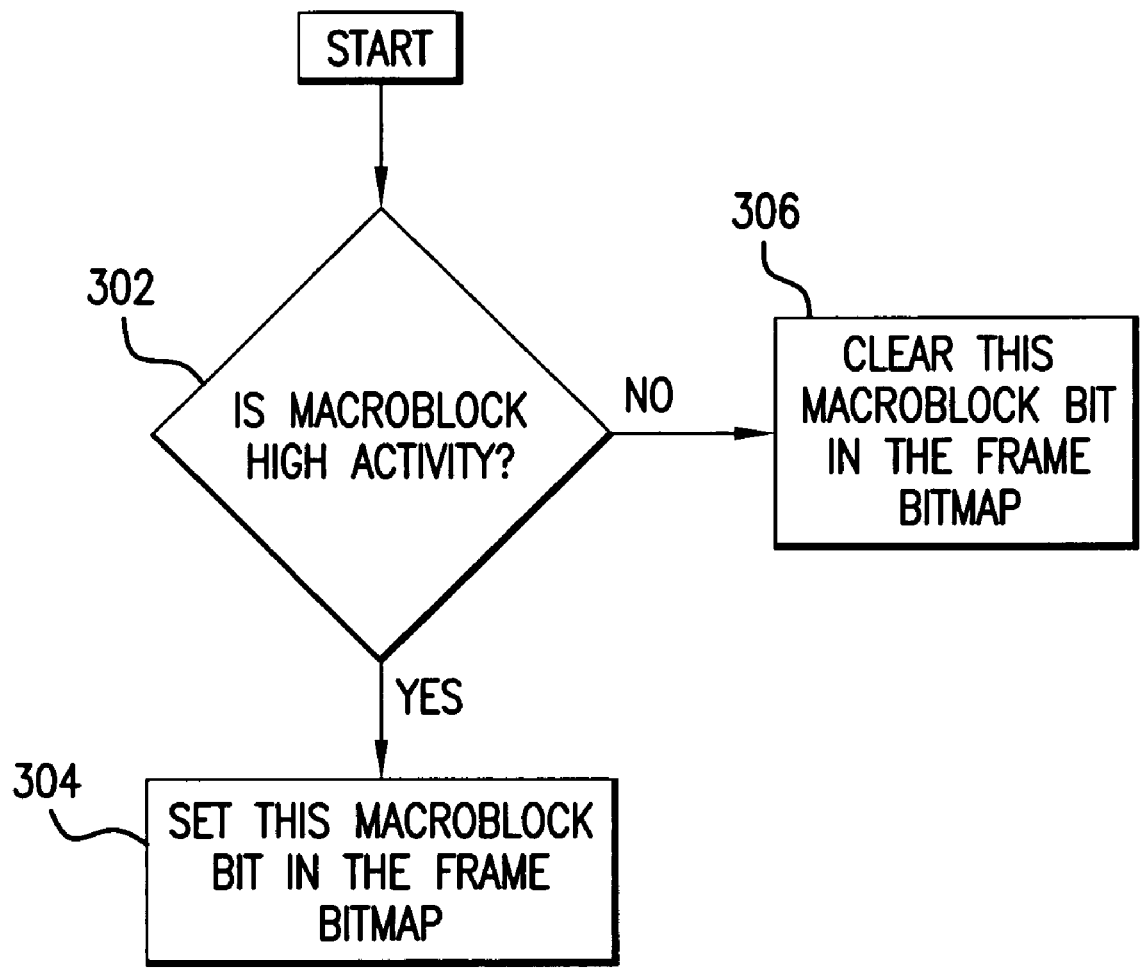
FIG. 3 is a flow chart illustrating the steps for evaluating high activity macroblocks in accordance with one embodiment of the present invention.

Referring now to FIG. 3, there is shown one embodiment of the steps used for indicating on a frame bitmap whether a macroblock is a high activity macroblock. The present invention determines whether a macroblock is a high activity macroblock at step 302. If the macroblock is a high activity macroblock, then the macroblock bit is set in the frame bitmap, at step 304. If the macroblock is not a high activity macroblock (i.e. a low activity macroblock), then the macroblock bit is cleared in the frame bit map, at step 306.

Figure 4:
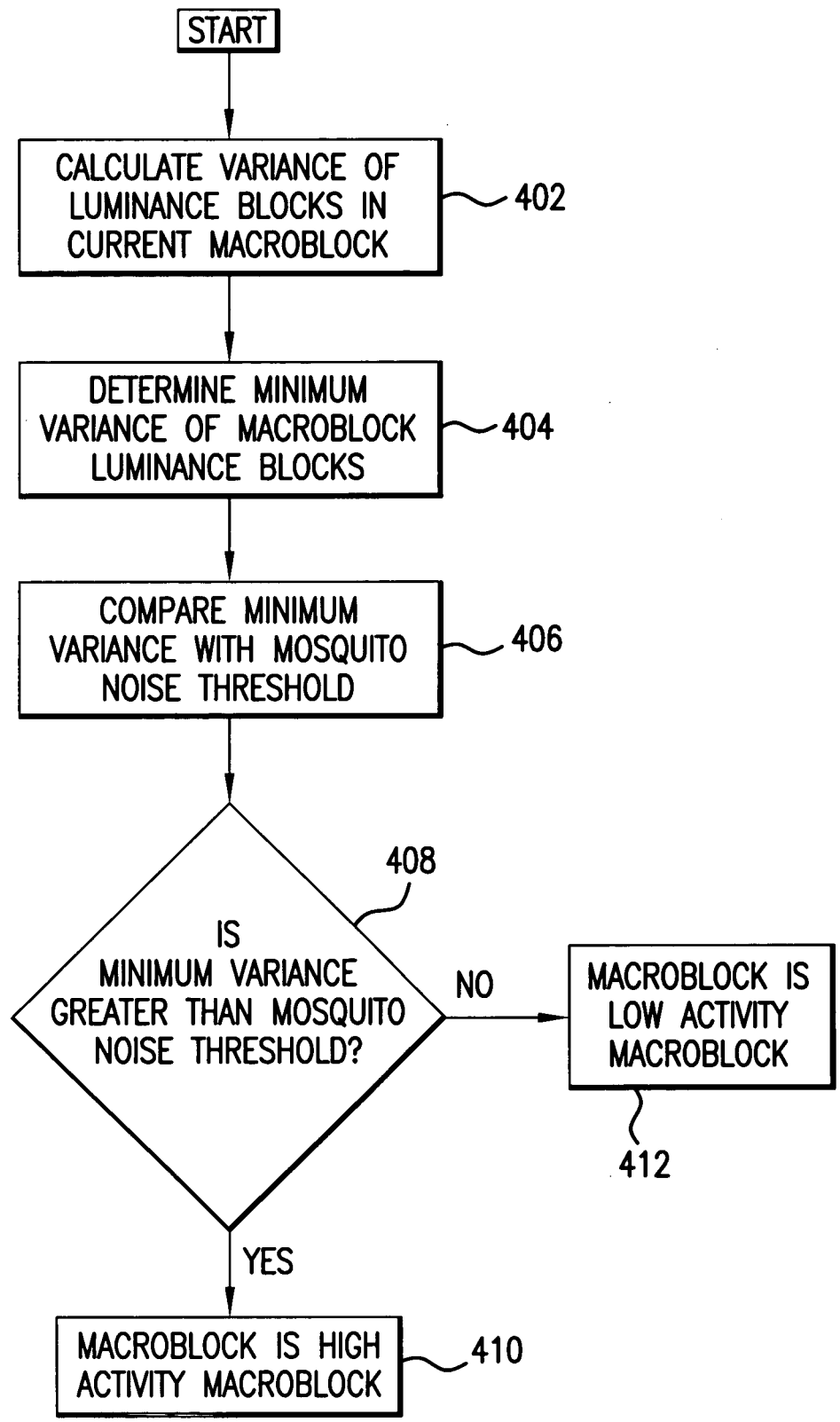
FIG. 4 is a flow chart illustrating the steps for determining whether a macroblock is a high activity macroblock in accordance with one embodiment of the present invention.

Referring now to FIG. 4, there is shown a flow chart of the steps for determining whether a macroblock is a high activity macroblock. First, the variance of each of the luminance blocks in the current macroblock is calculated at step 402. Then, the minimum variance of the luminance blocks is determined at step 404. Next, the minimum variance of the macroblock luminance blocks is compared with a mosquito noise threshold at step 406, and evaluated to determine whether the minimum variance is greater than ($>$) or lesser than or equal to ($<=$) the mosquito noise threshold at step 408. In one embodiment, if the minimum variance is greater than the mosquito noise threshold, then the macroblock is determined to be a high activity macroblock at step 410. If the minimum variance is not greater than the mosquito noise threshold, then the macroblock is determined to be a low activity macroblock at step 412.

Figure 5:
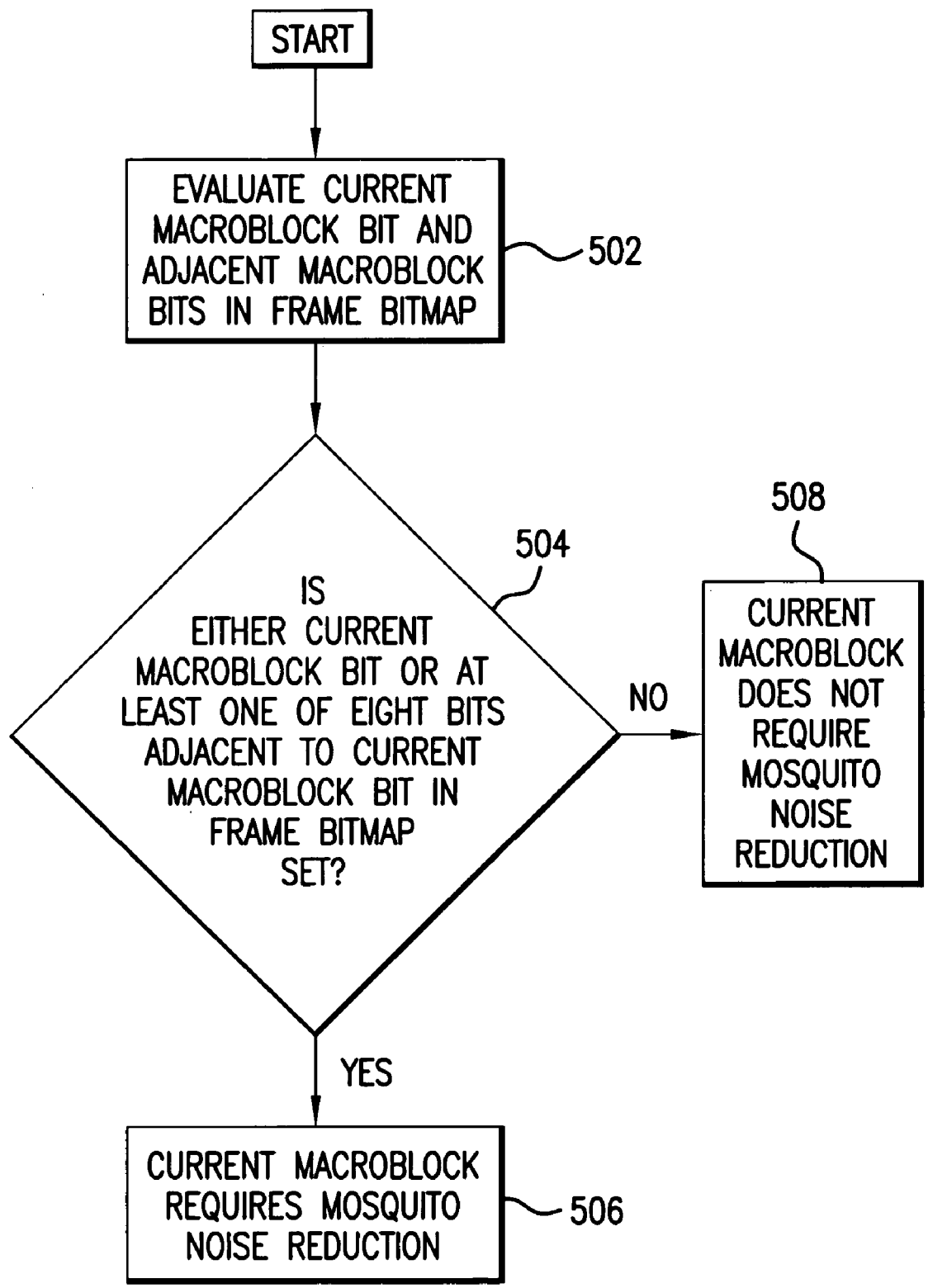
FIG. 5 is a flow chart illustrating the steps for evaluating macroblock bits in a frame bitmap in accordance with one embodiment of the present invention.

Referring now to FIG. 5, there is shown a flow chart of the steps for evaluating the macroblock bits in a frame bitmap. The current macroblock bit and its adjacent eight macroblock bits in the frame bit map are evaluated at step 502, to determine whether at least one of the nine macroblock bits is set in the frame bitmap at step 504. If either the current macroblock bit is set or if at least one of the adjacent macroblock bits is set, then the current macroblock represented by the current macroblock bit requires mosquito noise reduction at step 506. If the current macroblock bit is not set and if none of the adjacent macroblock bits are set, then the current macroblock represented by the current macroblock bit does not require mosquito noise reduction at step 508. The frame encoding process is performed in raster scan, row-by-row, macroblock by macroblock. Therefore, whether the adjacent macroblocks to the right of and below the current macroblock are high activity macroblocks is unknown. In one embodiment, the correlation to the previous frame may be used in order to estimate whether a macroblock in the current frame belongs to a high activity area or not.

Figure 6A:
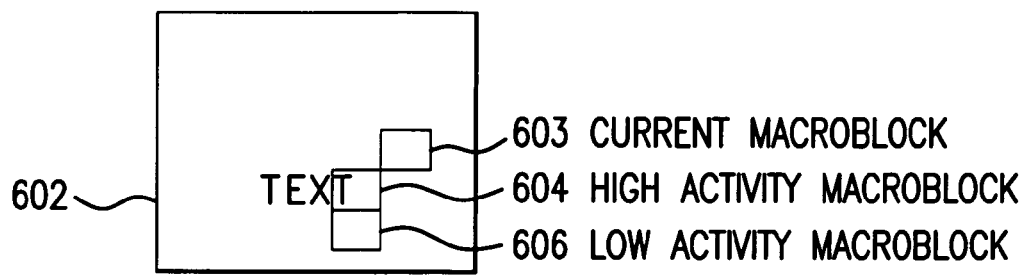
FIGS. 6a to 6c illustrate the steps of one embodiment of the present invention.
Figure 6B:
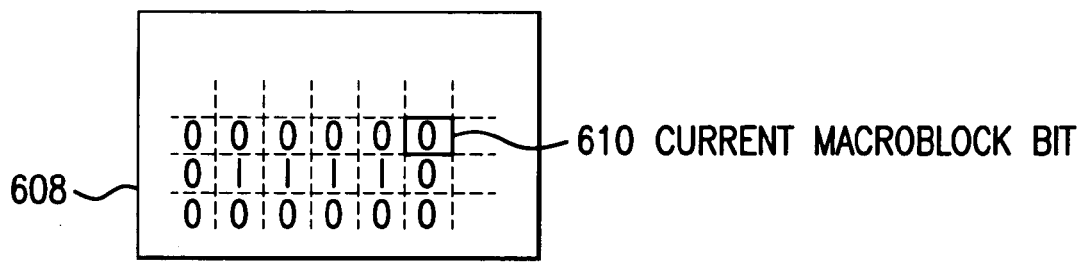
Figure 6C:
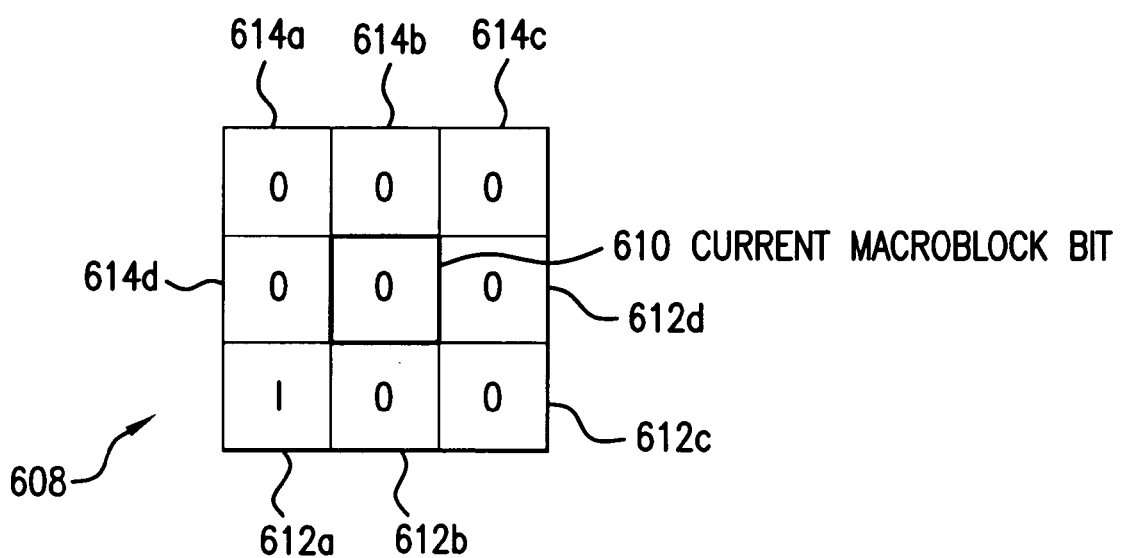

Referring now to FIGS. 6a to 6c, there is shown the steps of one embodiment of the present invention as applied to a current macroblock in a given frame 602. In FIG. 6a, the current frame 602 contains text ("TEXT") and the current macroblock 603 is near the text. Macroblock 604 is part of the text and is a high activity macroblock, while macroblock 606 is located below the text and is a low activity macroblock. FIG. 6b illustrates the frame bitmap 608 for the given frame 602. Each macroblock in frame 602 has a corresponding macroblock bit in the frame bitmap 608. FIG. 6b illustrates current macroblock bit 610 in the frame bitmap. FIG. 6c illustrates part of the frame bitmap 608 for the current macroblock bit 610 and its adjacent eight bits 612, 614 in the frame bitmap. Macroblock bit 612a is set in the corresponding frame bitmap 608 for the high activity macroblock 604. Adjacent bits 612a to 612d were set according to the previous frame, and adjacent bits 614a to 614d were set according to the current frame. The current macroblock bit 610 is set according to the current frame. Even though current macroblock bit 610 is not set in FIG. 6c, the current macroblock 603 represented by the current macroblock bit 610 requires mosquito noise reduction since at least one of the eight bits adjacent to the current macroblock bit 610 is set (i.e. bit 612a is set). The frame bitmap analyzer 206 from FIG. 2 can use either the current macroblock bit 610 from the current frame or use it from the previous frame (before overriding it). In a preferred embodiment of the invention, it's being used from the previous frame. In this case, one skilled in the art should understand that it is done in a pipeline in order to use the bit setter/clearer 205 in parallel with the frame bitmap analyzer 206 from FIG. 2.

In a preferred embodiment, the mosquito noise threshold of the invention is used by first calculating the log base 2 of the minimum variance of the luminance blocks of the current macroblock and then comparing it to 10. Ten is the used threshold after the log base 2 (or $2^{10}$=1024 when not using log base 2). One skilled in the art will realize that the present invention is not limited to determining the mosquito noise threshold by calculating the log base 2 of the variance and compare it to 10. The mosquito noise threshold could also be calculated by comparing the variance directly to 1024.

In one embodiment, the Log 2 of the variance can be calculated by right shifting the variance value by one again and again until zero is reached. The Log 2 estimation is the number of times the variance value was right shifted to reach zero. In accordance with the present invention, it is possible to count from 1 or from 0. The value can be checked either before or after it is right shifted and may cause a different mosquito noise threshold value.

In a preferred embodiment, the mosquito noise threshold is about $2^{10}$=1024. In another embodiment, the mosquito threshold may be $2^{11}$ or $2^9$ depending on the method used for calculating the log base 2. One skilled in the art will realize that the general principles of the present invention are not limited to any specific mosquito noise threshold value, but may be adjusted to suit image and system requirements.

In a preferred embodiment of the present invention, the mosquito noise threshold value is determined empirically. The mosquito noise threshold may be determined empirically by marking the areas within the frame that the invention detects as having the mosquito noise using a specific mosquito noise threshold. If the detection does not cover all the areas with mosquito noise, then the mosquito noise threshold should be decreased. If the detection covers areas which do not have the mosquito noise artifact, then the mosquito noise threshold should be increased. The mosquito noise threshold may be calibrated and fine tuned empirically by using many video sources with different properties.

Mosquito noise reduction is done by reducing the original bit rate quantiser scale code. The specific reduction value used depends on the bit rate used for encoding. Given a specific bit rate, when more bits are allocated to the mosquito noise areas (by reducing the quantiser scale in these areas), the present invention compensates by allocating less bits to the other areas. Allocating more bits means better video quality whereas allocating fewer bits means poorer video quality. One skilled in the art will realize that the specific reduction value used also depends on the original bit allocation of the original encoding algorithm and that the quantiser scale code reduction value should be set empirically depending on the encoder requirements. For example, in one embodiment, the quantiser scale code may be reduced by 4 for 4 Mbps video bit rate.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. An apparatus, comprising:
    a macroblock analyzer configured to designate a current macroblock, having a plurality of luminance blocks, as a high activity macroblock only when a minimum variance of respective variances of the luminance blocks is above a mosquito noise threshold;
    a bit setter/clearer configured to set a current macroblock bit corresponding to the current macroblock in a frame bitmap to indicate the high activity macroblock or to clear the current macroblock bit in the frame bitmap to indicate a low activity macroblock;
    a frame bitmap analyzer configured to analyze the frame bitmap to determine whether the current macroblock requires mosquito noise reduction; and a mosquito noise reducer configured to reduce an original bit rate quantizer scale code when the current macroblock requires the mosquito noise reduction.

2. The apparatus of claim 1, wherein the macroblock analyzer is further configured to designate the current macroblock as the high activity macroblock only when the minimum variance of respective variances of the luminance blocks is above the mosquito noise threshold and a minimum variance of respective variances of luminance blocks corresponding to at least one adjacent microblock is also above the mosquito noise threshold.

3. The apparatus of claim 1, wherein the macroblock analyzer is configured to designate the current macroblock as the high activity macroblock by:
    calculating a variance of each luminance block in the current macroblock;
    determining the minimum variance of the luminance blocks;
    comparing the minimum variance with the mosquito noise threshold; and
    designating the current macroblock as the high activity macroblock only when the minimum variance is above the mosquito noise threshold.

4. The apparatus of claim 2, wherein the mosquito noise threshold is determined by calculating log base 2 of the minimum variance of the luminance blocks and by comparing it to 10.

5. The apparatus of claim 2, wherein the mosquito noise threshold is approximately $2^{10}$.

6. The apparatus of claim 1, wherein the frame bitmap analyzer is configured to determine the current macroblock requires the mosquito noise reduction when at least one of the current macroblock bit and at least one adjacent macroblock bit corresponding to at least one adjacent macroblock is set.

7. The apparatus of claim 1, wherein the frame bitmap analyzer is configured to determine the current macroblock does not require the mosquito noise reduction when the current macroblock bit and all adjacent macroblock bits corresponding to all adjacent macroblocks are cleared.

8. A system for detecting mosquito noise in a video system, comprising:
    a macroblock analyzer configured to designate a current macroblock within a frame as a high activity macroblock only when a minimum variance of respective variances of luminance blocks of the current macroblock is above a mosquito noise threshold;
    a bit setter/clearer configured to indicate on a frame bitmap, having a current macroblock bit corresponding to the current macroblock and at least one adjacent macroblock bit corresponding to at least one adjacent macroblock, whether the current macroblock is the high activity macroblock;
    a frame bitmap analyzer configured to determine whether the current macroblock requires mosquito noise reduction by evaluating at least one of the current macroblock bit and the at least one adjacent macroblock bit; and
    a mosquito noise reducer configured to reduce the mosquito noise when the frame bitmap analyzer determines the current macroblock requires the mosquito noise reduction.

9. The system of claim 8, wherein the macroblock analyzer is further configured to designate the current macroblock as the high activity macroblock only when the minimum variance of respective variances of the luminance blocks is above the mosquito noise threshold and a minimum variance of respective variances of luminance blocks corresponding the to at least one adjacent microblock is also above the mosquito noise threshold.

10. The system of claim 8, wherein the macroblock analyzer is configured to designate the current macroblock as the high activity macroblock by:
    calculating a variance of each luminance block in the current macroblock;
    determining the minimum variance of the luminance blocks;
    comparing the minimum variance with the mosquito noise threshold; and
    designating the current macroblock as the high activity macroblock only when the minimum variance is above the mosquito noise threshold.

11. The system of claim 9, wherein the mosquito noise threshold is used by calculating log base 2 of the minimum variance of the luminance blocks and by comparing it to 10.

12. The system of claim 9, wherein the mosquito noise threshold is approximately $2^{10}$.

13. The system of claim 8, wherein the bit setter/clearer is configured to set the current macroblock bit in the frame bitmap when the current macroblock is designated as the high activity macroblock.

14. The system of claim 8, wherein the bit setter/clearer is configured to clear the current macroblock bit in the frame bitmap when the current macroblock is not designated as the high activity macroblock.

15. The system of claim 8, wherein the frame bitmap analyzer is configured to determine the current macroblock requires the mosquito noise reduction when at least one of the current macroblock bit and the at least one adjacent macroblock bit indicates the current macroblock is the high activity macroblock.

16. The system of claim 8, wherein the frame bitmap analyzer is configured to determine the current macroblock does not require the mosquito noise reduction when the current macroblock bit and all adjacent macroblock bits corresponding to all adjacent macroblocks indicate the current macroblock is not the high activity macroblock.

17. The system of claim 8, wherein the mosquito noise reducer is configured to reduce the mosquito noise by reducing an original bit rate quantizer scale code.

18. A method for reducing mosquito noise from a current frame in a video signal, comprising:
    (A) using a video encoder to designate a current macroblock in the current frame as a high activity macroblock only when a minimum variance of respective variances of the luminance blocks is above a mosquito noise threshold;
    (B) using the video encoder to indicate on a frame bitmap, having a current macroblock bit corresponding to the current macroblock and at least one adjacent macroblock bit corresponding to at least one adjacent macroblock, whether the current macroblock is the high activity macroblock by setting the current macroblock bit to indicate the high activity macroblock or clearing the current macroblock bit to indicate a low activity macroblock;
    (C) using the video encoder to determine whether the current macroblock requires mosquito noise reduction by evaluating at least one of the current macroblock bit and the at least one adjacent macroblock bit; and
    (D) using the video encoder to reduce mosquito noise in the current frame when the video encoder determines the current macroblock requires the mosquito noise reduction.

19. The method of claim 18, wherein step (A) comprises:
(A)(i) calculating a variance of each luminance block in the current macroblock;
(A)(ii) determining the minimum variance of the luminance blocks;
(A)(iii) comparing the minimum variance with the mosquito noise threshold; and
(A)(iv) designating the current macroblock as the high activity macroblock only when the minimum variance is above the mosquito noise threshold.

20. The method of claim 19, wherein step (A)(iii) comprises:
(A)(iii)(a) calculating log base 2 of the minimum variance of the luminance blocks and comparing it to 10 to determine the mosquito noise threshold.

21. The method of claim 19, wherein step (A)(iii) comprises:
(A)(iii)(a) comparing the minimum variance with approximately $2^{10}$.

22. The method of claim 18, wherein step (C) comprises:
(C)(i) determining the current macroblock requires the mosquito noise reduction when at least one of the current macroblock bit and the at least one adjacent macroblock bit is the high activity macroblock.

23. The method of claim 18, wherein step (C) comprises:
(C)(i) determining the current macroblock does not require the mosquito noise reduction when the current macroblock bit and all adjacent macroblock bits corresponding to all adjacent macroblocks are not the high activity macroblock.

24. The method of claim 18, wherein step (D) comprises:
(D)(i) reducing mosquito noise in the current frame by reducing an original bit rate quantizer scale.

25. A method for determining whether a current frame in a video signal contains mosquito noise, comprising:
(A) using a video encoder designate a current macroblock in the current frame as a high activity macroblock only when a minimum variance of respective variances of luminance blocks of the current macroblock is above a mosquito noise threshold;
(B) using the video encoder to indicate on a frame bitmap, having a current macroblock bit corresponding to the current macroblock and at least one adjacent macroblock bit corresponding to at least one adjacent macroblock, whether the current macroblock is the high activity macroblock;
(C) using the video encoder to evaluate at least one of the current macroblock bit and the at least one adjacent macroblock bit to determine whether the current macroblock requires mosquito noise reduction; and
(D) using the video encoder to reduce the mosquito noise in the current frame when the current macroblock requires the mosquito noise reduction.

26. The method of claim 25, wherein step (A) comprises:
(A)(i) calculating a variance of each luminance block in the current macroblock;
(A)(ii) determining the minimum variance of the luminance blocks;
(A)(iii) comparing the minimum variance with a mosquito noise threshold; and
(A)(iv) designating the current macroblock as the high activity macroblock only when the minimum variance is above the mosquito noise threshold.

27. The method of claim 26, wherein step (A)(iii) comprises:
(A)(iii)(a) calculating log base 2 of the minimum variance of the luminance blocks and comparing it to 10.

28. The method of claim 26, wherein step (A)(iii) comprises:
(A)(iii)(a) comparing the minimum variance with approximately $2^{10}$.

29. The method of claim 25, wherein step (B) comprises:
(B)(i) setting the current macroblock bit when the current macroblock is the high activity macroblock.

30. The method of claim 25, wherein step (B) comprises:
(B)(i) clearing the current macroblock bit when the current macroblock is not the high activity macroblock.

31. The method of claim 25, wherein step (C) comprises:
(C)(i) determining the current macroblock requires the mosquito noise reduction when at least one of the current macroblock bit and the at least one adjacent macroblock bit is the high activity macroblock.

32. The method of claim 25, wherein step (C) comprises:
(C)(i) determining the current macroblock does not require the mosquito noise reduction when the current macroblock bit and all adjacent macroblock bits corresponding to all adjacent macroblocks are not the high activity macroblock.

33. The method of claim 25, wherein step (D) comprises:
(D)(i) reducing mosquito noise in the current frame by reducing an original bit rate quantizer scale.

* * * * *